US012569323B2

(12) United States Patent
Zhu

(10) Patent No.: US 12,569,323 B2
(45) Date of Patent: Mar. 10, 2026

(54) WATERPROOF ORAL IRRIGATOR

(71) Applicant: FLY CAT ELECTRICAL CO., LTD.,
Shenzhen (CN)

(72) Inventor: Hepei Zhu, Shenzhen (CN)

(73) Assignee: FLY CAT ELECTRICAL CO., LTD.,
Shenzhen (CN)

( * ) Notice: Subject to any disclaimer, the term of this
patent is extended or adjusted under 35
U.S.C. 154(b) by 738 days.

(21) Appl. No.: 17/860,542

(22) Filed: Jul. 8, 2022

(65) Prior Publication Data

US 2023/0074717 A1    Mar. 9, 2023

(30) Foreign Application Priority Data

Sep. 7, 2021    (CN) .......................... 202111041655.X

(51) Int. Cl.
*A61C 17/02*        (2006.01)
(52) U.S. Cl.
CPC ................................ *A61C 17/0202* (2013.01)
(58) Field of Classification Search
CPC ..... A61C 17/00; A61C 17/02; A61C 17/0202;
A61C 17/0217; A61C 17/024; A61C
17/028; A61C 17/032; A61C 17/16; A61C
17/22; A61C 17/225; A61C 17/221; A61C
17/36; A61C 1/0007; A61C 1/0061; A61C
1/0084; A61C 1/0092; A61H 13/00;
(Continued)

(56) References Cited

U.S. PATENT DOCUMENTS 4,152,565 A * 5/1979 Rose ..................... H01H 15/005
                                                            200/16 D
4,413,199 A * 11/1983 Fischer .................. A61C 17/22
                                                            310/91
(Continued)

FOREIGN PATENT DOCUMENTS

CN            205586102 U      9/2016
CN            108553191 A      9/2018
(Continued)

OTHER PUBLICATIONS

CNIPA First Office Action corresponding to CN Application No.
202111041655.X; Issue date, Oct. 13, 2024, 15 pages.
(Continued)

*Primary Examiner* — Colin W Stuart
(74) *Attorney, Agent, or Firm* — CANTOR COLBURN
LLP

(57) ABSTRACT

A waterproof oral irrigator including an oral irrigator housing which is provided with a sliding recess on an outer wall thereof; a push switch slidably fitted with the sliding recess and provided with a magnetic element; and a control circuit board arranged inside the oral irrigator housing and being provided with a plurality of Hall elements. A plurality of Hall elements are sequentially disposed at intervals along a sliding direction of a push switch. When the push switch slides along the sliding recess, the magnetic element can be driven to move to positions sensed by the plurality of Hall elements in sequence. Since the outer wall of the oral irrigator housing is provided with the sliding recess, and the sliding recess is not communicated with the interior of the oral irrigator, so that the waterproof performance of the oral irrigator can be greatly improved.

6 Claims, 3 Drawing Sheets

(58) Field of Classification Search
CPC ...... A61H 13/005; H01H 15/00; H01H 15/24; H01H 36/00; H01H 36/0006; H01H 36/0013; H01H 36/0066; H01H 36/0073; H01H 36/008; H01H 2036/0086; H01H 9/04; H01H 9/02; H01H 9/00; H01H 9/0264; H01H 9/0271; H01H 9/041; H01H 2009/048
USPC .......................................... 601/162; 200/547
See application file for complete search history.

(56)                    References Cited

U.S. PATENT DOCUMENTS

| | | | | |
|---|---|---|---|---|
| 4,429,202 | A | * | 1/1984 | Tedd ...................... H01H 15/06 |
| | | | | 200/16 R |
| 4,441,000 | A | * | 4/1984 | Suwa ..................... H01H 15/06 |
| | | | | 200/16 R |
| 5,218,956 | A | * | 6/1993 | Handler ............... A61C 17/032 |
| | | | | 601/165 |
| 5,321,865 | A | * | 6/1994 | Kaeser ................... A61C 17/36 |
| | | | | 601/162 |
| 5,344,317 | A | * | 9/1994 | Pacher ................... A61C 17/02 |
| | | | | 433/80 |
| 5,862,714 | A | * | 1/1999 | Fujimoto ............... H01H 15/02 |
| | | | | 200/548 |

| | | | | |
|---|---|---|---|---|
| 10,105,201 | B2 | * | 10/2018 | Woodard ............. A61C 15/046 |
| 11,826,214 | B2 | | 11/2023 | Luettgen et al. |
| 12,383,387 | B2 | | 8/2025 | Luettgen et al. |
| 2006/0250203 | A1 | * | 11/2006 | Marmaropoulos .... H01H 36/00 |
| | | | | 335/205 |
| 2016/0151133 | A1 | | 6/2016 | Luettgen et al. |
| 2020/0276003 | A1 | | 9/2020 | Luettgen et al. |
| 2022/0093352 | A1 | * | 3/2022 | Shan ........................ H01H 1/50 |
| 2022/0183124 | A1 | * | 6/2022 | Zhou ..................... H01H 15/08 |
| 2023/0200959 | A1 | | 6/2023 | Luettgen et al. |
| 2024/0041578 | A1 | | 2/2024 | Luettgen et al. |

FOREIGN PATENT DOCUMENTS

| | | | | |
|---|---|---|---|---|
| CN | 108618861 | A | | 10/2018 |
| CN | 208756209 | U | | 4/2019 |
| CN | 212650938 | U | * | 3/2021 |
| CN | 112807115 | A | | 5/2021 |

OTHER PUBLICATIONS

CNIPA Rejection Decision corresponding to CN Application No. 202111041655.X; Issue date, Aug. 26, 2025, 5 pages.
CNIPA Second Office Action corresponding to CN Application No. 202111041655.X; Issue date, Jun. 11, 2025, 16 pages.

* cited by examiner

WATERPROOF ORAL IRRIGATOR

CROSS-REFERENCE TO RELATED APPLICATIONS

Pursuant to 35 U.S.C. § 119 and the Paris Convention Treaty, this application claims priority to Chinese patent application No. 202111041655.X, filed on Sep. 7, 2021, and entitled "Waterproof oral irrigator", the entire contents of which are incorporated herein by reference.

TECHNICAL FIELD

The present disclosure relates to the field of oral cleaning technologies, and particularly to waterproof oral irrigators.

DESCRIPTION OF RELATED ART

Oral irrigators are new oral cleaning appliances, which can clean teeth and gaps between the teeth by spraying water jets, and also has an effect of massage. Since the oral irrigator cleans teeth and gaps between the teeth through the form of a water jet, the waterproofness is an important performance for the oral irrigator.

In the traditional technology, a switch of the oral irrigator realizes the switch effect through a point contact form. In order to achieve a higher waterproof level, a secondary encapsulation is usually performed to a housing to achieve a higher waterproofing level, or a spring-type touch switch is used to achieve a waterproof structure.

However, when the waterproof level is improved by the secondary encapsulation, it is prone to problems of water ingress and air leakage caused by an inadequate encapsulation, and when the waterproof structure is formed by the spring-type touch switch, the spring-type touch switch will be invalid and a command will cannot be judged when a button has water.

SUMMARY

Based on the above-mentioned, it is necessary to provide a waterproof oral irrigator for the problem of how to effectively improve the waterproofness of the oral irrigator.

A waterproof oral irrigator includes: an oral irrigator housing provided with a sliding recess on an outer wall thereof; a push switch slidably fitted with the sliding recess, wherein the push switch is provided with a magnetic element; and a control circuit board arranged inside the oral irrigator housing, wherein the control circuit board is provided with a plurality of Hall elements, the plurality of Hall elements being sequentially disposed at intervals along a sliding direction of the push switch, wherein when the push switch is sliding along the sliding recess, the magnetic element can be driven to move in turn to a position sensed by the plurality of Hall elements.

In one of the embodiments, the push switch includes an abutting member; a limiting groove is defined on a side wall of the sliding recess, and the abutting member is slidably fitted with the limiting groove.

In one of the embodiments, the push switch further includes a push top wall and a push side wall connected to a periphery of the push top wall, wherein the push side wall is slidably fitted with the side wall of the sliding recess, and the abutting member is connected to a side of the push side wall adjacent to the side wall of the sliding recess.

In one of the embodiments, a connecting hole is defined on the push side wall, and the abutting member movably passes through the connecting hole; wherein the push switch further comprises an elastic return member used for keeping the abutting member in sliding fit with the limiting groove.

In one of the embodiments, there are at least two abutting members, a number of the connecting hole corresponds to a number of the abutting member, and the connecting holes are defined on two opposing push side walls, wherein the at least two abutting members pass through at least two connecting holes in a one-to-one correspondence, wherein a number of the limiting groove is two, and two limiting grooves are defined on two opposite side walls of the sliding recess.

In one of the embodiments, the push top wall and the push side wall are enclosed to form an accommodating cavity, and the abutting member comprises: a limiting body, a connecting body and a sliding body connected in sequence, wherein the limiting body is slidably fitted with the limiting groove, the connecting body passes through the connecting hole, and the sliding body located in the accommodating cavity, wherein a size of the sliding body is larger than that of the connecting hole.

In one of the embodiments, there are two abutting members arranged oppositely, and two ends of the elastic return member abut against two sliding bodies of the abutting members arranged oppositely; wherein the sliding body comprises a first sliding part and a second sliding part connected to the first sliding part, and a minimum distance between a side of the first sliding part adjacent to a bottom wall of the sliding recess and the bottom wall of the sliding recess is different from a minimum distance between a side of the second sliding part adjacent to a bottom wall of the sliding recess and the bottom wall of the sliding recess; wherein the first sliding part and the second sliding part of one of the two abutting members arranged oppositely are respectively slidably fitted with the second sliding part and the first sliding part of the other abutting member.

In one of the embodiments, the sliding body further includes a convex portion located between the first sliding part and the second sliding part and connected to the first sliding part or the second sliding part; wherein two ends of the elastic return member are respectively disposed on two convex portions arranged oppositely; and in this way, the elastic return member is provided between the first sliding part and the second sliding part of one abutting member.

In one of the embodiments, the push switch further includes at least two fasteners provided in the accommodating cavity and arranged oppositely in pairs; one end of the fastener is connected to the push top wall, and the other end is provided with a buckle portion; the first sliding part and the second sliding part are both located between the at least two fasteners arranged oppositely in pairs, and the buckle portion is slidably fitted with a side of the second sliding part closer to the bottom wall of the sliding recess.

In one of the embodiments, the bottom wall of the limiting groove defines a plurality of notches spaced in sequence along the sliding direction of the push switch, and an end of the abutting member adjacent to the side wall of the sliding recess is provided with a protrusion that abuts against the notch; when the push switch slides relative to the oral irrigator housing, the protrusion can abut against a plurality of notches sequentially; a number of the notch corresponds to a number of the Hall element, and an interval between two adjacent notches is the same as an interval between two adjacent Hall elements.

For the above-mentioned waterproof oral irrigator, since the outer wall of the oral irrigator housing is provided with the sliding recess, the sliding recess is not in communication with the interior of the oral irrigator, that is, there is no gap on the surface of the oral irrigator, the waterproof performance of the oral irrigator can be greatly improved. At the same time, the start and stop of the oral irrigator, and the gear position of the oral irrigator are controlled by the interaction of the magnetic element and the Hall element.

Figure 1:
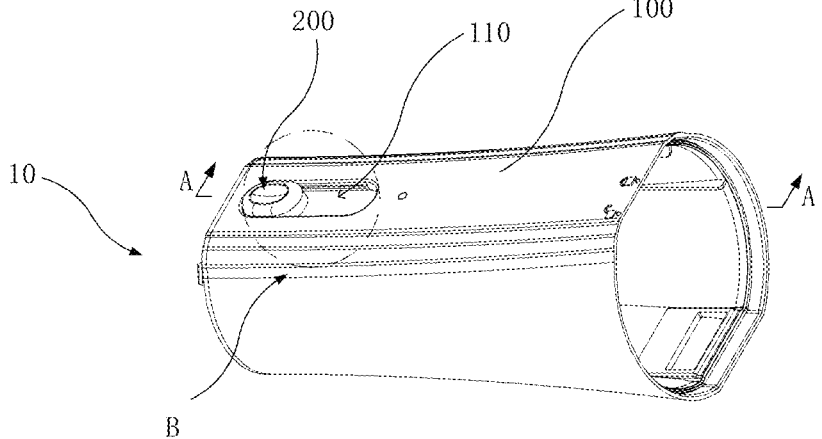
FIG. 1 is an axial schematic view of a part of the structure of a waterproof oral irrigator according to an embodiment.

Reference numerals: 10: oral irrigator; 100: oral irrigator housing; 110: sliding recess; 111: limiting groove; 111a: notch; 200: push switch; 210: push top wall; 220: push side wall; 221: connecting hole; 230: magnetic element; 240: abutting member; 241: limiting body; 241a: protrusion; 242: connecting body; 243: sliding body; 243a: first sliding part; 243b: second sliding part; 244: convex portion; 250: elastic return member; 260: fastener; 261: buckle portion; 270: fixing body: 271: fixing groove; 280: accommodating cavity; 300: control circuit board; 310: Hall element.

DETAILED DESCRIPTION OF THE EMBODIMENTS

In order to make the above objectives, features and advantages of the present disclosure more obvious and understandable, specific implementations of the present disclosure are described in detail below with reference to the accompanying drawings. In the following description, many specific details are set forth in order to fully understand the present disclosure. However, the present disclosure can be implemented in many other ways different from those described herein, and those skilled in the art can make similar improvements without departing from the connotation of the present disclosure. Therefore, the present disclosure is not limited by the specific embodiments disclosed below.

In the description of the present disclosure, it should be understood that the orientation or position relationship indicated by the terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate the description of the present disclosure and simplify the description, rather than indicating or implying that the indicated device or element must have a particular orientation or be constructed and operated in a specific orientation, and therefore cannot be construed as limitation of the present disclosure.

In addition, the terms "first" and "second" are used for descriptive purposes only, which cannot be construed as indicating or implying a relative importance, or implicitly specifying the number of the indicated technical features. Therefore, the features defined with "first" and "second" may explicitly or implicitly include at least one of the features. In the description of the present disclosure, "a plurality of" means at least two, such as two, three, etc., unless specifically defined otherwise.

In the present disclosure, unless otherwise explicitly specified and defined, the terms "mounted", "coupled", "connected" and "fixed" should be understood in a broad sense, such as, it can be a fixed connection, or a detachable connection, or integrated; it can be a mechanical connection, or an electrical connection; it can be a direct connection, an indirect connection through an intermediate medium, it can be an internal communication between two elements, or an interaction between two elements, unless otherwise explicitly defined. For those skilled in the art, the specific meanings of the above terms in the present disclosure can be understood according to the specific situation.

In the present disclosure, unless otherwise explicitly specified and defined, a first feature being "on" or "under" a second feature may mean that the first feature is in direct contact with the second feature, or the first feature is in indirect contact with the second feature via an intermediate medium. Furthermore, the first feature being "over", "above" and "on top of" the second feature may mean that the first feature is directly above or obliquely above the second feature, or only means that the level of the first feature is higher than that of the second feature in a horizontal direction. The first feature being "below", "underneath" or "under" the second feature may mean that the first feature is directly underneath or obliquely underneath the second feature, or only means that the level of the first feature is lower than that of the second feature.

It should be noted that, when one element is referred to as "being fixed to" or "being disposed on" another element, the element may be directly on the another element or there may be an intermediate element therebetween. When one element is considered to be "connected to" another element, the element may be directly connected to the another element or there may be an intermediate element therebetween. The terms "vertical", "horizontal", "up", "down", "left", "right" and similar expressions used herein are for illustrative purposes only and do not mean that they are the only means of implementation.

Figure 2:
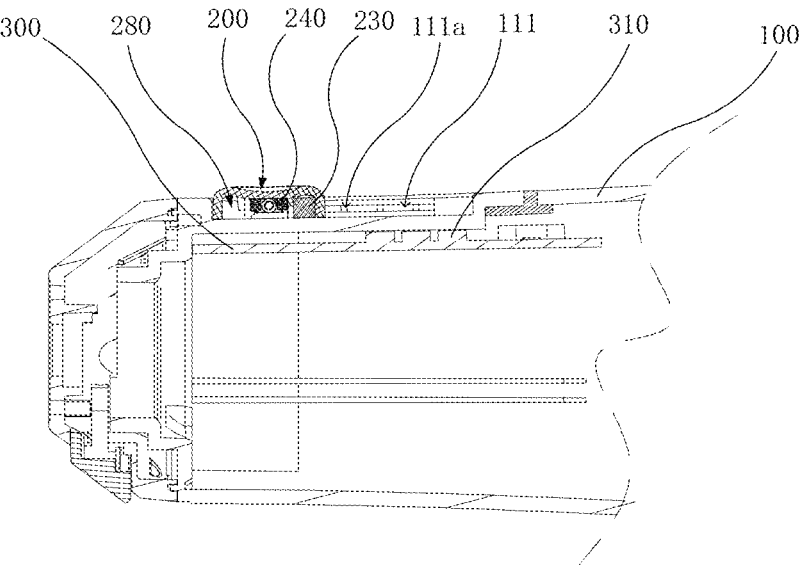
FIG. 2 is a cross-sectional view taken along a line A-A in FIG. 1.

Referring to FIG. 1 in combination with FIG. 2, FIG. 1 shows an axial schematic view of a part of the structure of a waterproof oral irrigator according to an embodiment of the present disclosure, and FIG. 2 shows a cross-sectional view taken along a line A-A in FIG. 1. A waterproof oral irrigator 10 provided in an embodiment of the present disclosure includes an oral irrigator housing 100, a push switch 200 and a control circuit board 300. The outer part of the oral irrigator housing 100 is formed with a sliding recess 110, for example, in an inward recessed manner. The push switch 200 is slidably fitted with the sliding recess 110, and the push switch 200 is provided with a magnetic element 230. The control circuit board 300 is arranged inside the oral irrigator housing, and a plurality of Hall elements 310 are provided on the control circuit board 300. The plurality of Hall elements 310 are sequentially disposed at intervals along the sliding direction of the push switch 200. When the push switch 200 slides along the sliding recess 110, the magnetic element 230 can be driven to move to positions sensed by the plurality of Hall elements 310 in sequence.

In the above-mentioned embodiment, since the sliding recess 110 is disposed on the outer part of the oral irrigator housing 100, specifically, for example, it is recessed inward, the sliding recess 110 is not in communication with the inside of the waterproof oral irrigator 10, that is, there is no gap on the surface of the oral irrigator housing 100. In this way, the waterproof performance of the waterproof oral irrigator 10 can be greatly improved. Moreover, in the above-mentioned embodiment, when the push switch 200 slides along the sliding recess 110, the magnetic element 230 can be driven to move to positions sensed by a plurality of Hall elements 310 in sequence. In addition, since the Hall element 310 is disposed on the control circuit board 300, when multiple Hall elements 310 at different positions sense the magnetic element 230, sensed information can be transmitted to the control circuit board 300. Therefore, the control circuit board 300 correspondingly controls the waterproof oral irrigator 10 to realize functions such as start, stop, gear position adjustment and the like according to the information transmitted by the Hall element 310.

It can be understood that the above-mentioned Hall element 310 is a semiconductor magnetoelectric device, which uses the Hall effect to work, and the specific working principle is not described herein.

In the above-mentioned embodiment, the waterproofness of the waterproof oral irrigator 10 can be significantly improved while ensuring the function of the waterproof oral irrigator 10 only through simple structures such as the push switch 200 provided with the magnetic element 230, the sliding recess 110, the Hall element 310 and the like. The structure of the present disclosure is simpler and the waterproof effect is better compared with waterproof ways in the prior art, such as providing a waterproof rubber ring to improve the waterproofness of the waterproof oral irrigator 10.

Figure 3:
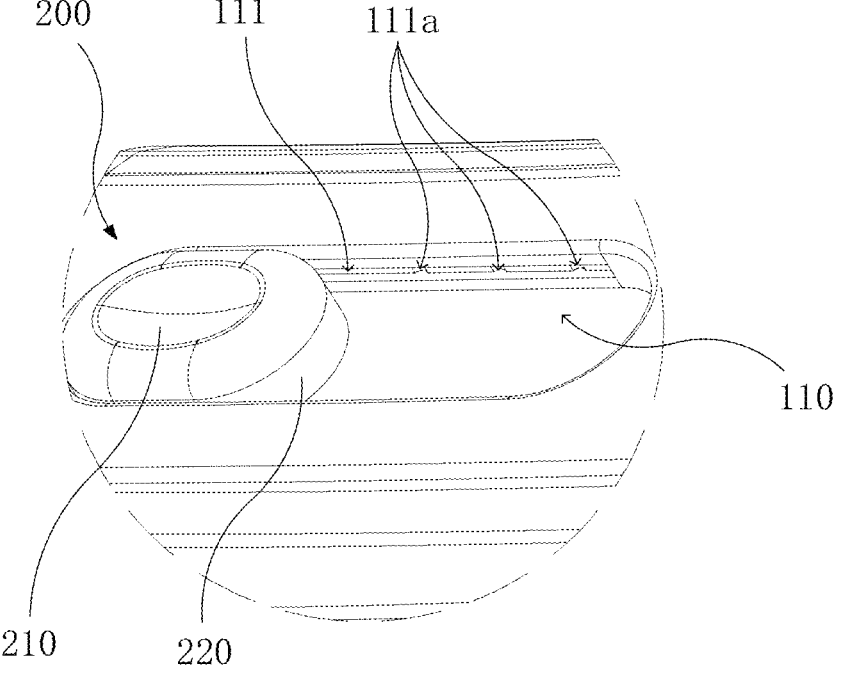
FIG. 3 is a partial enlarged view of a portion B in FIG. 1.

Referring to FIGS. 2 and 3, in an embodiment, the push switch 200 includes an abutting member 240. A limiting groove 111 is defined on a side wall of the sliding recess 110, and the abutting member 240 is slidably fitted with the limiting groove 111. In this way, due to the slidable fitting of the abutting member 240 and the limit groove 111, the sliding of the push switch 200 can be guided and limited. On the one hand, the slidable fitting of the abutting member 240 and the limiting groove 111 can prevent the push switch 200 from being falling off from the oral irrigator housing 100. On the other hand, it can ensure that the push switch 200 slides towards a preset direction, which is easy to determine a positional relationship between the magnetic element 230 and the Hall element 310, and it is convenient for the push switch 200 to cooperate with the Hall element 310 to realize the purpose of the control of the start and stop of the waterproof oral irrigator 10, or to realize the gear position control of the waterproof oral irrigator 10.

Figure 4:
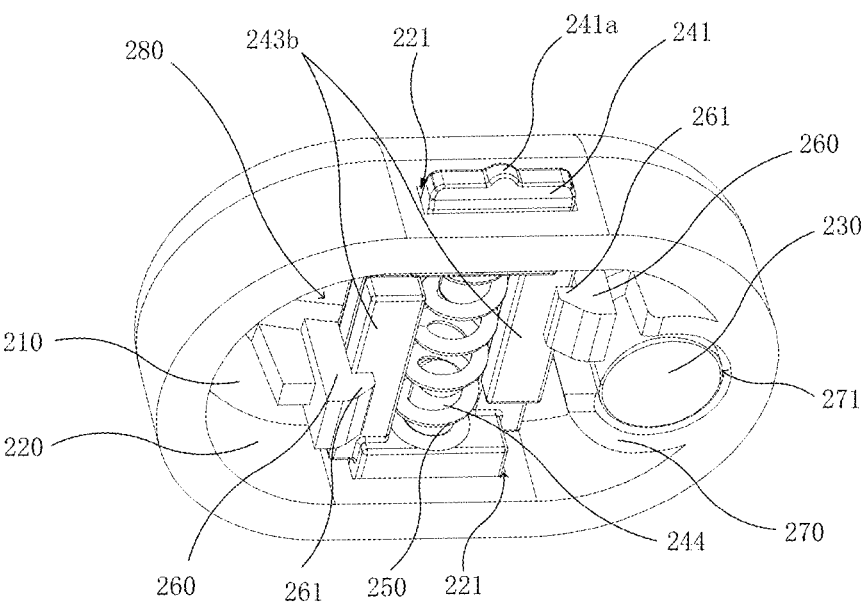
FIG. 4 is an axial schematic view of the push switch of the waterproof oral irrigator shown in FIG. 1.

Referring to FIGS. 3 and 4, in an embodiment, the push switch 200 further includes a push top wall 210 and a push side wall 220 connected to the periphery of the push top wall 210. The push side wall 220 is slidably fitted with the side wall of the sliding recess 110. The abutting member 240 is connected to a side of the push side wall 220 adjacent to the side wall of the sliding recess 110. In combination with the above-mentioned embodiment, by sliding the push side wall 220 and the side wall of the sliding recess 110, and the abutting member 240 being connected to the side of the push side wall 220 adjacent to the side wall of the sliding recess 110, it can be ensured that the abutting member 240 is slidably fitted with the limiting groove 111. That is, it is ensured that while the push switch 200 and the sliding recess 110 are slidably fitted with each other, the push switch 200 is prevented from falling off the oral irrigator housing 100, and the reliability of the waterproof oral irrigator 10 in use is improved.

Referring to FIG. 4, in an embodiment, a connecting hole 221 is defined on the push side wall 220, and the abutting member 240 movably passes through the connecting hole 221. The push switch 200 further includes an elastic return member 250, and the elastic return member 250 is used for keeping the abutting member 240 in sliding fit with the limiting groove 111. In this way, by arranging the abutting member 240 to movably pass through the connecting hole 221, and by using the elastic return member 250 to keep the abutting member 240 in sliding fit with the limiting groove 111, the stability of the cooperation between the push switch 200 and the oral irrigator housing 100 can be ensured.

In some embodiments, the connecting hole 221 is a blind hole, and a side of the connecting hole 221 adjacent to the sliding recess 110 is in communication with the outside. Two ends of the elastic return member 250 abut against the bottom walls of the abutting member 240 and the connecting hole 221, respectively. In this way, by arranging the two ends of the elastic return member 250 to abut against the bottom walls of the abutting member 240 and the connecting hole 221 respectively, and by arranging the abutting member 240 to movably pass through the connecting hole 221, the abutting member 240 has a certain degree of flexible activity space. In this way, on the one hand, it is convenient to retract the part of the abutting member 240 that is slidably fitted with the limiting groove 111 by compressing the elastic return member 250, so as to facilitate the installation of the push switch 200 inside the sliding recess 110. On the other hand, by compressing the elastic return member 250, the push switch 200 is separated from the sliding recess 110 to clean up the scale and other stains in the sliding recess 110, preventing the reduction of the sensitivity of the push switch 200 to control the waterproof oral irrigator 10 due to accumulation of strains. At the same time, the waterproof oral irrigator 10 can be easily cleaned, and the overall sanitary condition of the waterproof oral irrigator 10 can be improved.

In some embodiments, two ends of the abutting member 240 are respectively fixedly connected to the push side wall 220 and slidably fitted with the limiting groove 111, and the abutting member 240 is an elastic member. Since the abutting member 240 is an elastic member, which has a certain elastic deformation ability, it is convenient to install the push switch 200 into the sliding recess 110 and to take the push switch 200 out of the sliding recess 110.

Referring to FIG. 2 and FIG. 3 in combination with FIG. 4, in an embodiment, there are at least two abutting members 240. The number of the connecting hole 221 corresponds to the number of the abutting member 240, and the connecting holes 221 are defined on two opposing push side walls 220. The at least two abutting members 240 pass through the at least two connecting holes 221 in a one-to-one correspondence. The number of the limiting groove 111 is two, and the two limiting grooves 111 are defined on two opposite side walls of the sliding recess 110. Since the at least two abutting members 240 is arranged to pass through the at least two connecting holes 221 in a one-to-one correspondence, and the two limiting grooves 111 are defined on the two opposite side walls of the sliding recess 110, when the push switch 200 slides, the two limiting grooves 111 oppositely provided on the sliding recess 110 that are slidably fitted with the push switch 200 can limit the position of the push switch 200, making the slide of the push switch 200 more stably.

In some embodiments, the number of the abutting member 240 may be specifically, for example, 4, 6, or 8, and the number of the connecting hole 221 corresponds to the number of the abutting member 240. The above-mentioned connecting holes 221 are respectively defined in pairs and evenly at intervals on the two oppositely arranged push side walls 220 along the sliding direction of the push switch 200.

The abutting member 240 passes through the connecting hole 221 in a one-to-one correspondence, to further ensure the smooth sliding of the push switch 200 and further prevent the push switch 200 from falling off the waterproof oral irrigator 10. It should be understood that the number of the abutting member 240 is not limited to 4, 6, or 8, the example here is only to facilitate the understanding of this embodiment, and the number of the abutting member 240 can be adjusted accordingly according to actual needs.

Referring to FIGS. 2 and 3, in an embodiment, the bottom wall of the limiting groove 111 defines a plurality of notches 111a spaced in sequence along the sliding direction of the push switch 200. An end of the abutting member 240 adjacent to the side wall of the sliding recess 110 is provided with a protrusion 241a that abuts against the notch 111a. When the push switch 200 is sliding relative to the oral irrigator housing 100, the protrusion 241a can sequentially abut against a plurality of notches 111a. When the push switch 200 is sliding in the sliding recess 110, since the abutting member 240 is provided with a protrusion 241a capable of abutting against the plurality of notches 111a, the push switch 200 can have a plurality of preset positions. The above-mentioned preset position refers to a position in which the notch 111a has a certain limit effect on the protrusion 241a when the push switch 200 slides until the protrusion 241a abuts against a certain notch 111a, so that the position of the push switch 200 is relatively determined.

Furthermore, in the above-mentioned embodiment, a surface of the protrusion 241a for abutting against the notch 111a is a circular sliding surface, such as a circular arc-shaped curved surface or an elliptical curved surface. In addition, a wall surface of the notch 111a is a circular sliding surface, such as, a circular arc-shaped curved surface or an elliptical curved surface, adapted to the surface of the protrusion 241a. In this way, the circular sliding surface on the protrusion 241a can facilitate the movement of the protrusion 241a into or out of the notch 111a. In addition, during the process of the protrusion 241a moving into one of the notches 111a to sliding out of another notch 111a, the user needs to apply a different pushing force to the push switch 200 when driving the push switch 200 to slide, that is, the damping feeling that the push switch 200 feedbacks to the user is different, so that it is convenient for the user to clearly feel whether the push switch 200 is switched to the required preset position as described above, and it is clear whether the push switch 200 can achieve the preset control effect.

Referring to FIG. 2 in combination with FIG. 3, in an embodiment, the number of the notch 111a corresponds to the number of the Hall element 310, and the interval between two adjacent notches 111a is the same as the interval between two adjacent Hall elements 310. In combination with the foregoing embodiment, it can be known that the number of notches 111a corresponds to the number of preset positions of the push switch 200 described above. Therefore, by setting the number of notches 111a to correspond to the number of Hall elements 310, it is convenient to set the control circuit board 300 to perform different function control according to the information sensed by the Hall elements 310 at each preset position. Specifically, the function control includes such as the start control, stop control and control of different gear positions of the waterproof oral irrigator 10. In addition, the interval between two adjacent notches 111a is the same as the interval between two adjacent Hall elements 310. That is, when the push switch 200 moves between two adjacent preset positions, the information detected by the Hall elements 310 are approximately the same. Therefore, it is convenient to ensure that the Hall element 310 has the same or almost the same detection sensitivity for each preset position. The sensitivity of the control of the waterproof oral irrigator 10 is improved.

It should be understood that the number of notches 111a can be adjusted to be different from the number of Hall elements 310 according to actual needs. For example, the number of notches 111a may be greater than the number of Hall elements 310, that is, the notches 111a have more preset positions. The extra preset position may be a position that facilitates the removal of the push switch 200, or a position that is convenient for cleaning the sliding recess 110, or the like.

Referring to FIG. 4 in combination with FIG. 3, in an embodiment, the push top wall 210 and the push side wall 220 are enclosed to form an accommodating cavity 280. The abutting member 240 includes a limiting body 241, a connecting body 242, and a sliding body 243 connected in sequence. The limiting body 241 is slidably fitted with the limiting groove 111, the connecting body 242 passes through the connecting hole 221, and the sliding body 243 is located in the accommodating cavity 280. The size of the sliding body 243 is larger than the size of the connecting hole 221. By positioning the sliding body 243 in the accommodating cavity 280 and setting the size of the sliding body 243 to be larger than the size of the connecting hole 221, on the one hand, the push switch 200 can be easily installed in the sliding recess 110, and on the other hand, when the push switch 200 is detached from the oral irrigator housing 100, the abutting member can be prevented from popping out from the connecting hole 221 under the action of the elastic return member 250, which facilitates the detachment of the push switch 200.

In some embodiments, the above-mentioned protrusion 241a is disposed on the limiting body 241 to enable the push switch 200 to reach the preset position.

In an embodiment, the limiting body 241 may be provided to abut against the above-mentioned notches 111a. Specifically, a side of the limiting body 241 adjacent to the notch 111a is a smoothly arc-shaped curved surface. The shape of the notch 111a is matched with the above-mentioned smoothly arc-shaped curved surface, so that the push switch 200 can have a plurality of preset positions by the limiting body 241 abutting against the notch 111a.

Referring again to FIG. 4, in an embodiment, there are two abutting members 240, and the two abutting members 240 are arranged oppositely, and two ends of the elastic return member 250 respectively abut against the sliding bodies 243 of the two abutting members 240. Specifically, in this embodiment, the connecting hole 221 may be a through hole. It can be understood that the two oppositely arranged push side walls 220 are both provided with a connecting hole 221, that is, the accommodating cavity 280 can be in communication with the outside on the two oppositely arranged push side walls 221 through the above-mentioned connecting holes 221. In this way, the elastic return member 250 can be disposed in the accommodating cavity, and two ends of the elastic return member 250 abut against the sliding bodies 243 of the two abutting members 240, respectively.

Figure 5:
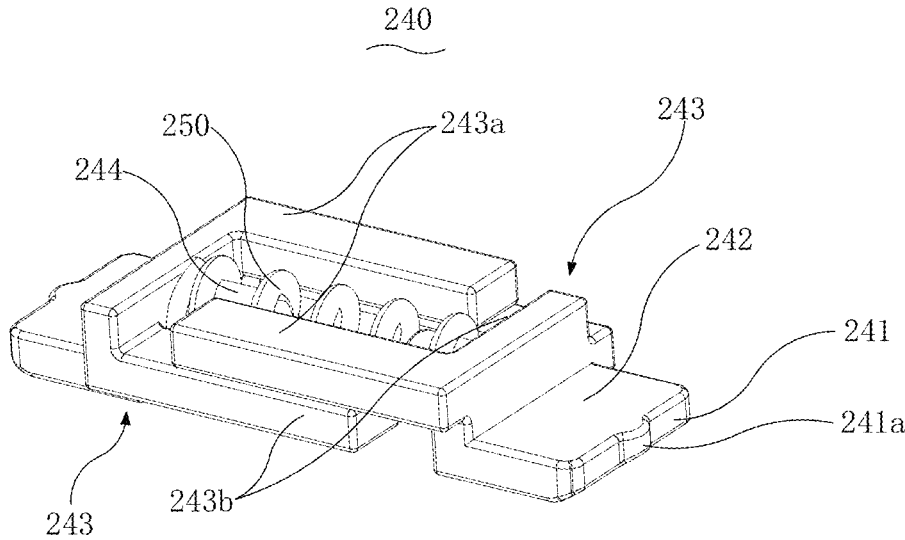
FIG. 5 is an axial schematic diagram of a part of the structure of the push switch shown in FIG. 4.

Further referring to FIG. 4 in combination with FIG. 5, in an embodiment, the sliding body 243 includes a first sliding part 243a and a second sliding part 243b connected to the first sliding part 243a. The minimum distance between the side of the first sliding part 243a adjacent to the bottom wall of the sliding recess 110 and the bottom wall of the sliding recess 110 is different from the minimum distance between the side of the second sliding part 243*b* adjacent to the bottom wall of the sliding recess 110 and the bottom wall of the sliding recess 110. The first sliding part 243*a* and the second sliding part 243*b* of one of the two abutting members 240 arranged oppositely are respectively slidably fitted with the second sliding part 243*b* and the first sliding part 243*a* of the other abutting member 240. By slidable fitting the first sliding part 243*a* and the second sliding part 243*b* of one of the two abutting members 240 with the second sliding part 243*b* and the first sliding part 243*a* of the other abutting member 240, on the one hand, it is convenient to install the abutting member 240 in the accommodating cavity 280 from the side of the push switch 200 adjacent to the bottom wall of the sliding recess 110, on the other hand, since the sliding of the two abutting members 240 arranged oppositely is simultaneously or substantially simultaneously, the first sliding part 243*a* and the second sliding part 243*b* of the two oppositely arranged abutting members 240 can limit the sliding movement of each other.

It should be noted that the first sliding part 243*a* and the second sliding part 243*b* may be a part of the sliding member, that is, the first sliding part 243*a* and the second sliding part 243*b* are integrally formed with other parts of the sliding member; they may also be an independent component that is separable from other parts of the sliding member, that is, the first sliding part 243*a* and the second sliding part 243*b* may be manufactured independently, and then combined with other parts of the sliding member into a whole. As shown in FIG. 5, in an embodiment, the first sliding part 243*a* and the second sliding part 243*b* are a part of the sliding member manufactured by integral forming.

Referring to FIG. 4 and FIG. 5, it can be understood that the sliding body 243 is formed by stacking one side of two "L"-shaped structures. That is to say, one side of the first sliding part 243*a* with substantially "L"-shaped profile and one side of the second sliding part 243*b* with substantially "L"-shaped profile are stacked on each other, thereby forming a sliding body 243 with a substantially "□"-shaped profile, and there is a height difference between the first sliding part 243*a* and the second sliding part 243*b*. The above-mentioned height difference refers to that the distance between the first sliding part 243*a* and the bottom wall of the sliding recess 110 and the distance between the second sliding part 243*b* and the bottom wall of the sliding recess 110 are different.

Referring to FIG. 4 and FIG. 5, it should be understood that the structures and sizes of the two abutting members 240 arranged oppositely are the same. Therefore, among the two abutting members 240 arranged oppositely, the one with a greater minimum distance from the bottom wall of the sliding recess 110 is always the first sliding part 243*a*. Similarly, the one with a smaller minimum distance from the bottom wall of the sliding recess 110 is always the second sliding part 243*b*. Furthermore, when the two abutting members 240 are arranged oppositely, the first sliding part 243*a* and the second sliding part 243*b* of the two abutting members 240 are cross-slidably fitted. The above-mentioned cross-slidably fitted refers to that the first sliding part 243*a* of one abutting member 240 is slidably fitted with the second sliding part 243*b* of the other abutting member 240 arranged oppositely thereto. Similarly, the second sliding part 243*b* of one abutting member 240 is slidably fitted with the first sliding part 243*a* of the other abutting member 240 arranged oppositely thereto. In this way, by the cross-slidable arrangement of the first sliding part 243*a* and the second sliding part 243*b* of the two oppositely arranged abutting members 240, the positions of the two oppositely arranged abutting members 240 can be mutually limited to ensure the stability and reliability of the abutting member 240 when sliding.

Referring to FIG. 5, in an embodiment, the sliding body 243 further includes a convex portion 244. In one of the sliding bodies 243, the convex portion 244 is located between the first sliding part 243*a* and the second sliding part 243*b*, and the convex portion 244 is connected to the first sliding part 243*a* or the second sliding part 243*b*. two ends of the elastic return member 250 are respectively disposed on two convex portions 244 arranged oppositely. In this way, the elastic return member 250 is disposed between the first sliding part 243*a* and the second sliding part 243*b* of one abutting member 240. Specifically, in combination with the above-mentioned embodiments, since the sliding bodies 243 of the two oppositely arranged abutting members 240 after cross-slidably fit are roughly "square"-shaped profile, and the convex portion 244 is located between the first sliding part 243*a* and the second sliding part 243*a* and connected to the first sliding part 243*a* or the second sliding part 243*b*, the convex portion 244 is located in the space enclosed by the two first sliding parts 243*a* and the two second sliding parts 243*b* of the two oppositely arranged abutting members 240. two ends of the elastic return member 250 are disposed on the two convex portions 244, so that the elastic return member 250 can more stably abut between the two oppositely arranged abutting members 240, so as to better ensure the sliding fit between the abutting member 240 and the limiting groove 111.

Referring to FIGS. 4 and 5, in an embodiment, the push switch 200 further includes at least two fasteners 260. The at least two fasteners 260 are provided in the accommodating cavity 280 and arranged oppositely in pairs, and the first sliding part 243*a* and the second sliding part 243*b* are both located between the at least two fasteners 260 arranged oppositely in pairs. By arranging the fasteners 260 oppositely in pairs and locating the first sliding part 243*a* and the second sliding part 243*b* between the at least two fasteners 260 arranged oppositely in pairs, the sliding movement of the sliding body 243 can be further limited.

Referring to FIGS. 4 and 5, in an embodiment, one end of the fastener 260 is connected to the push top wall 210, and the other end is provided with a buckle portion 261. The buckle portion 261 is slidably fitted with the side of the second sliding part 243*b* closer to the bottom wall of the sliding recess 110. In combination with the above-mentioned embodiments, since the second sliding part 243*b* is always closer to the bottom wall of the sliding recess 110, by slidable fitting the buckle portion 261 with the side of the second sliding part 243*b* closer to the bottom wall of the sliding recess 110, the sliding movement of the second sliding part 243*b* can be limited. In addition, since the two abutting members 240 arranged oppositely are cross-slidably fitted, that is, the positions of the two abutting members 240 arranged oppositely can be mutually limited, and further combined with the limiting effect of the second sliding part 243*b* by the buckle portion 261, thereby the sliding action of the two abutting members 240 arranged oppositely can be further limited, so that they can only slide in a preset direction.

In the above-mentioned push switch 200, only by using two oppositely arranged abutting members 240 and two oppositely arranged fasteners 260, it is possible to realize that the abutting members 240 can only slide in a preset direction. Compared with disposing some notches for limiting the position of the abutting member 240 in the accommodating cavity 280, it can make the structure simpler by using the above-mentioned cross-fitted abutting members 240 and fasteners 260.

Further, the fastener 260 is an elastic member. As the fastener 260 is an elastic member, the installation of the abutting member 240 can be facilitated. Specifically, the two opposing abutting members 240 can be cross-slidably fitted first, and two ends of the elastic return member 250 are arranged on the convex portions 244. Subsequently, the installed abutting members 240 and the elastic return member 250 are pressed into the fasteners 260 and the two abutting members 240 are released, then the two abutting members 240 can pass through the connecting holes 221 and be slidably fitted with the limiting groove 111 under the action of the elastic return member 250. The installation of the push switch 200 is simplified.

Referring to FIG. 4, in an embodiment, the side of the push top wall 210 adjacent to the bottom wall of the sliding recess 110 extends in a direction away from the push top wall 210 to form a fixing body 270, and the fixing body 270 is provided with a fixing groove 271 for bearing the magnetic element 230. The magnetic element 230 is fixedly connected to the wall of the fixing groove 271. By providing the fixing groove 271, the position of the magnetic element 230 can be easily controlled.

Each of the technical features of the above-mentioned embodiments may be combined arbitrarily. To simplify the description, not all the possible combinations of each of the technical features in the above-mentioned embodiments are described. However, all of the combinations of these technical features should be considered as within the scope of this disclosure, as long as such combinations do not contradict with each other.

The above-mentioned embodiments are merely illustrative of several embodiments of the present disclosure, which are described specifically and in detail, but it cannot be understood to limit the scope of the present disclosure. It should be noted that, for those skilled in the art, several variations and improvements may be made without departing from the concept of the present disclosure, and all of which are within the protection scope of the present disclosure. Therefore, the protection scope of the present disclosure shall be defined by the appended claims.

What is claimed is:

1. A waterproof oral irrigator, comprising:

an oral irrigator housing, wherein an outer wall of the oral irrigator housing is provided with a sliding recess;

a push switch slidably fitted with the sliding recess, wherein the push switch is provided with a magnetic element; and a control circuit board arranged inside the oral irrigator housing, wherein the control circuit board is provided with a plurality of Hall elements, and the plurality of Hall elements are sequentially arranged at intervals along a sliding direction of the push switch, wherein when the push switch is sliding along the sliding recess, the push switch drives the magnetic element to move to positions sensed by the plurality of Hall elements in sequence;

wherein the push switch comprises a plurality of abutting members; a limiting groove is defined on a side wall of the sliding recess, and each abutting member is slidably fitted with the limiting groove;

wherein the push switch further comprises a push top wall and a push side wall connected to a periphery of the push top wall, wherein the push side wall is slidably fitted with the side wall of the sliding recess, and each abutting member is connected to the side of the push side wall adjacent to the side wall of the sliding recess;

wherein a plurality of connecting holes are defined on the push side wall, and each abutting member movably passes through a corresponding connecting hole of the plurality of connecting holes; wherein the push switch further comprises an elastic return member configured to cause each abutting member to be in sliding fit with the limiting groove;

wherein the push top wall and the push side wall are enclosed to form an accommodating cavity, and each abutting member comprises: a limiting body, a connecting body and a sliding body connected in sequence, wherein the limiting body is slidably fitted with the limiting groove, the connecting body passes through the corresponding connecting hole, and the sliding body is located in the accommodating cavity, wherein the sliding body is larger than the corresponding connecting hole in size.

2. The waterproof oral irrigator according to claim 1, wherein there are at least two abutting members, a number of the connecting holes corresponds to a number of the at least two abutting members, and the connecting holes are defined on two opposing push side walls, wherein the at least two abutting members pass through at least two connecting holes in a one-to-one correspondence, wherein there are two limiting grooves, and the two limiting grooves are disposed on two opposite side walls of the sliding recess.

3. The waterproof oral irrigator according to claim 1, wherein there are two oppositely arranged abutting members, and two ends of the elastic return member abut against two sliding bodies of the oppositely arranged abutting members respectively; wherein each sliding body of the two sliding bodies comprises a first sliding part and a second sliding part connected to the first sliding part, and a minimum distance between a side of the first sliding part adjacent to a bottom wall of the sliding recess and the bottom wall of the sliding recess is different from a minimum distance between a side of the second sliding part adjacent to the bottom wall of the sliding recess and the bottom wall of the sliding recess; wherein the first sliding part and the second sliding part of one abutting member of the two oppositely arranged abutting members are slidably fitted with the second sliding part and the first sliding part of the other abutting member of the oppositely arranged two abutting members, respectively.

4. The waterproof oral irrigator according to claim 3, wherein each sliding body further comprises two oppositely arranged convex portions located between the first sliding part and the second sliding part, and the two oppositely arranged convex portions are connected to the first sliding part or the second sliding part; and two ends of the elastic return member are respectively disposed on the two oppositely arranged convex portions, such that the elastic return member is arranged between the first sliding part and the second sliding part of one of the two oppositely arranged abutting members.

5. The waterproof oral irrigator according to claim 3, wherein the push switch further comprises at least two fasteners arranged in the accommodating cavity and the at least two fasteners are arranged oppositely in pairs; one end of each fastener is connected to the push top wall, and an other end of each fastener is provided with a buckle portion; the first sliding part and the second sliding part in each sliding body are located between the at least two fasteners arranged oppositely in pairs, and the buckle portion is slidably fitted with a side of the second sliding part closer to the bottom wall of the sliding recess.

6. The waterproof oral irrigator according to claim 1, wherein a bottom wall of the limiting groove is provided with a plurality of notches spaced in sequence along a sliding direction of the push switch, and an end of each abutting member adjacent to the side wall of the sliding recess is provided with a protrusion that abuts against one of the plurality of notches; when the push switch slides relative to the oral irrigator housing, the protrusion abut against the plurality of notches sequentially; a number of the plurality of notches is identical to a number of the plurality of Hall elements, and an interval between two adjacent notches of the plurality of notches is identical to an interval between two adjacent Hall elements of the plurality of Hall elements.

\* \* \* \* \*